Sept. 22, 1931.   P. L. ROBERTSON   1,824,623
TOOL HOLDER
Filed July 2, 1928
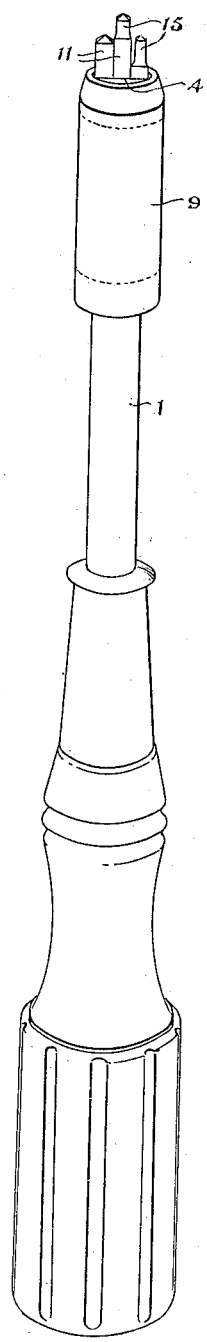
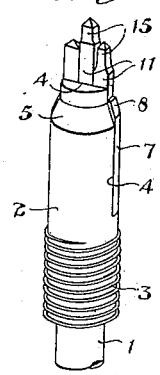
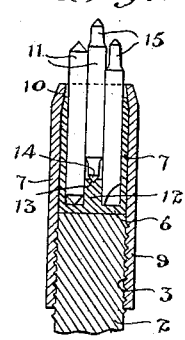
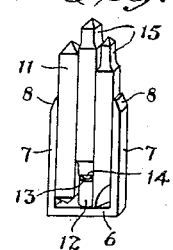
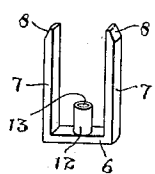
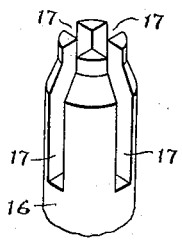
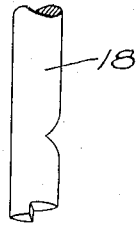
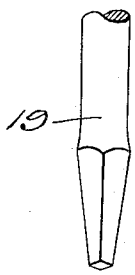
Inventor.
Peter Lymburner Robertson.

Patented Sept. 22, 1931

1,824,623

UNITED STATES PATENT OFFICE

PETER LYMBURNER ROBERTSON, OF MILTON, ONTARIO, CANADA

TOOL HOLDER

Application filed July 2, 1928. Serial No. 289,954.

The principal objects of the invention are to provide a holder for small tools such as screw driver bits, awls, reamers, etc., which will hold the tools securely and which will be extremely handy to use and will enable a very quick interchange of tools.

A further and important object is to provide sets of tools which may be sold as small units and may be readily removed or replaced in the holder.

The principal feature of the invention consists in the novel construction of a chuck and tools whereby a plurality of individual tools are nested in parallel arrangement in a slotted chuck and are clamped together by an enclosing sleeve.

A further and important feature consists in the novel form of member for holding a group of tools as a unit adapted to be placed in the clamping chuck.

In the accompanying drawings, Figure 1 is a perspective view of the tool holder complete.

Figure 2 is a perspective view of the slotted chuck end of the holder with the clamping sleeve removed.

Figure 3 is a longitudinal sectional view of the chuck end of the holder.

Figure 4 is a perspective view of the inner tool holder removed.

Figure 5 is a perspective view of the inner holder with the tools removed.

Figure 6 is a perspective view of a modified form of inner holder.

Figure 7 is a perspective view of the form of chuck for the form of holder shown in Figure 6.

Figure 8 is a perspective view of one form of shank for the tool holder.

Figure 9 is a perspective view of another form of shank for the holder.

This invention has been devised for holding small tools to be used either in a hand holder or a brace or drill and of the nature requiring quick changing from one bit to another so as to have the operating tool held securely in axial alignment with the holder and the work.

The shank 1 is formed with a cylindrical end 2 which is provided with a raised thread 3 at its lower end. The upper end is slotted longitudinally with a slot 4 extending across the axis and having parallel sides. The tip of the chuck end 2 is bevelled to a slightly reduced end 5.

The inner tool holder 6 is a U-shaped metal member, preferably formed of hardened steel which fits snugly into the slot 4, the outer sides 7 being preferably curved transversely to conform to the curvature of the chuck end 2.

The extremities 8 of the holder 6 are bevelled inwardly presenting bevelled surfaces beyond the bevelled surface portion of the chuck end 2.

The sleeve 9 is internally threaded at its lower end to engage the threads 3 and an inwardly bevelled surface 10 at the upper end engages the bevelled ends 8 of the U-holder to press them inwardly.

The tools or bits 11 are square in cross section and are of the same width as the holder 6 and there are preferably three of same arranged to nest together between the sides 7 of said holder.

A stud 12 is secured centrally in the bottom bar of the holder 6 and has a cupped upper end 13 to receive the pointed end 14 of the bits.

The bits herein shown are principally of the type used as drivers for square recessed screws having slightly tapered square ends 15 with pyramid points. Bits for slotted screws may be used if desired and certain of the bits are here shown provided with slot-engaging ends, as indicated in Figures 3, 4 and 6. Also awls or other small tools of a like kind may be employed, one of these being shown in the chuck in Figure 6.

In the modified form shown in Figures 6 and 7 the chuck 16 is formed with right angularly crossed slots 17 and the inner holder is a double U formation with the two portions arranged at right angles to fit into the crossed slots 17. This form of holder will accommodate five bits which can be interchanged at will.

It will of course be readily understood that any desired form of handle, or means for operating the holder may be used with my improved chuck and tools and in Figures 8 and 9 I show two forms of shanks commonly used.

What I claim as my invention is:

1. A tool holder, comprising a rigid chuck having a solid head provided with a transverse slot in the end, said slot presenting unbroken parallelly spaced side walls and being open at each side of the chuck and adapted to receive a plurality of tools having parallel sided shanks, a U-shaped holder adapted to fit bodily into said slot and hold said tools snugly together, a stud extending upwardly from the bottom of said U-shaped holder adapted to hold the central tool in a position with its working end projecting beyond the adjacent tools, and a sleeve threaded on said chuck adapted to clamp the sides of said U-shaped holder against said tools and secure said U-shaped holder and tools in said slot.

2. In a tool, a holder having a transverse slot open at the sides, a plurality of parallel sided bits arranged in contact in said slot, a holder for said bits arranged in said slot and engaging the outer sides of the outer bits, and means for clamping said second mentioned holder and said bits in said slot.

3. A tool holder, comprising a rigid head slotted transversely, said slot presenting unbroken parallelly-spaced side walls and being open at each side of the head and adapted to receive a group of parallel-sided tools, clamping means positioned in said slot for engaging the outward sides of the outer tools in said slot, and threaded means engaging said clamping means for clamping said tools into a rigid unit in said slot.

4. A tool holder, comprising a rigid head slotted transversely, said slot presenting unbroken parallelly-spaced side walls and being open at each side of the head and adapted to receive a group of parallel-sided tools, a holder fitting in said slot and supporting said tools therein and presenting parallelly spaced plane surfaces engaging the outward parallel surfaces of the outer tools in said slot, and means co-operating with said second mentioned holder for clamping the second mentioned holder and tools into a rigid unit in said slot.

5. A tool holder, comprising a rigid head slotted transversely, said slot presenting unbroken parallelly-spaced side walls and being open at each side of the head and adapted to receive a group of parallel-sided tools, a holder fitting in said slot and supporting said tools therein and presenting parallelly spaced plane surfaces engaging the outward parallel surfaces of the outer tools in said slot, said second mentioned holder presenting outward sides substantially flush with the outer surfaces of said head and having bevelled surfaces spaced beyond the head, and a member threaded on said head and bevelled to engage the bevelled surfaces of said second mentioned holder to constrict the latter and clamp the tools and second mentioned holder into a rigid unit in said slot.

6. A tool holder, comprising a rigid head slotted transversely, said slot presenting unbroken parallelly-spaced side walls and being open at each side of the head and adapted to receive a group of parallel-sided tools, a member fitting in said slot having parallelly spaced side arms adapted to normally hold the tools snugly together in said slot, the ends of said arms projecting from said slot and being bevelled, and a sleeve threaded on said slotted head and having a bevelled surface engaging the bevelled ends of said arms to lock said member and tools together in a rigid unit in said slot.

7. A tool holder, comprising a rigid head, slotted transversely, said slot presenting unbroken parallelly-spaced side walls and being open at each side of the head and adapted to receive a group of parallel-sided tools, a U-shaped holder fitting snugly into said slot between the parallel walls thereof to hold the tools snugly together, and a sleeve threaded on said head engaging the sides of said U-shaped holder to hold it in said slot and clamp said tools and U-shaped holder into a rigid unit in said slot.

8. A tool holder, comprising a rigid head slotted transversely, said slot presenting unbroken parallelly-spaced side walls and being open at each side of the head and adapted to receive a group of parallel-sided tools, a holder fitting in said slot and supporting said tools therein and presenting parallelly spaced plane surfaces engaging the outward parallel surfaces of the outer tools in said slot, a stud at the bottom of said second mentioned holder disposed centrally between the plane surfaces of said second mentioned holder and adapted to co-operate with the central tool of the group to support same in its working position beyond the other tools of the group, and means co-operating with said second mentioned holder for clamping the second mentioned holder and tools into a rigid unit in said slot.

9. A tool holder, comprising a rigid head slotted transversely, said slot presenting unbroken parallelly-spaced side walls and being open at each side of the head, a tool holder having flat parallel sides fitting snugly between the parallelly spaced walls of said slot and presenting parallelly spaced flat gripping surfaces, a tool having a rectangular shank adapted to fit snugly in the space between the walls of said slot and the parallelly-spaced gripping surfaces of said second mentioned tool holder, and means for forcing said second mentioned holder and tool into gripping contact to form a rigid unit thereof in said slot.

PETER LYMBURNER ROBERTSON.